United States Patent
Moreno

(10) Patent No.: US 7,347,079 B2
(45) Date of Patent: Mar. 25, 2008

(54) WHEEL RECONDITIONING DEVICE

(75) Inventor: Vicente Moreno Moreno, São Paulo (BR)

(73) Assignee: Indústria de Màquinas e Ferramentas Carjac Ltda., Diadema/SP (BZ)

( * ) Notice: Subject to any disclaimer, the term of this patent is extended or adjusted under 35 U.S.C. 154(b) by 303 days.

(21) Appl. No.: 11/265,565

(22) Filed: Nov. 2, 2005

(65) Prior Publication Data

US 2006/0260121 A1    Nov. 23, 2006

(30) Foreign Application Priority Data

May 17, 2005    (BR) .................................... 0502070

(51) Int. Cl.
*B21D 3/14* (2006.01)
*B21J 13/04* (2006.01)

(52) U.S. Cl. ........................... 72/705; 72/457; 72/316; 72/311

(58) Field of Classification Search ................. 72/705, 72/31.02, 701, 316, 311, 457, 392, 393; 29/894.38, 29/894.381, 894.35
See application file for complete search history.

(56) References Cited

U.S. PATENT DOCUMENTS

| | | | | |
|---|---|---|---|---|
| 1,489,151 A | * | 4/1924 | Prossen | 72/316 |
| 1,548,521 A | * | 8/1925 | Fowler | 72/316 |
| 1,606,489 A | * | 11/1926 | Winter | 72/390.6 |
| 1,647,211 A | * | 11/1927 | Bushek | 72/311 |
| 1,650,216 A | * | 11/1927 | Ingham | 72/316 |
| 2,261,246 A | * | 11/1941 | Fried | 72/308 |
| 3,065,780 A | * | 11/1962 | Romak | 72/316 |
| 3,855,831 A | * | 12/1974 | Senkyrik | 72/31.02 |
| 4,910,986 A | * | 3/1990 | Funkhouser | 72/31.02 |
| 5,156,635 A | * | 10/1992 | Snow, Jr. | 72/110 |
| 5,224,371 A | * | 7/1993 | Vierto | 72/447 |
| 5,303,573 A | * | 4/1994 | Douglas | 72/420 |
| 5,499,524 A | * | 3/1996 | Len | 72/420 |
| 5,634,361 A | * | 6/1997 | Herschman et al. | 72/31.02 |
| 6,367,303 B1 | * | 4/2002 | Hizono | 72/316 |
| 2004/0035164 A1 | * | 2/2004 | Blaser, Jr. | 72/31.02 |
| 2006/0196244 A1 | * | 9/2006 | Neubauer | 72/705 |

* cited by examiner

*Primary Examiner*—Dmitry Suhol
(74) *Attorney, Agent, or Firm*—Wolf Block Schorr & Solis-Cohen LLP

(57) ABSTRACT

WHEEL RECONDITIONING DEVICE, composed of a base (1), from whose upper facing extends a vertical, rear column (2), from which extend forward one upper cross brace (3) and one intermediate cross brace (4), the latter equipped with axles (5) and (6) for the positioning and fixation of the wheel, and which interconnect with the upper cross brace (3) by means of a frontal, vertical and mobile column (11), and additional swinging cross brace (13) connected to the upper cross brace (3), responsible for the fixation of the wheel in the desired position for use of the hydraulic jack.

1 Claim, 4 Drawing Sheets

WHEEL RECONDITIONING DEVICE

FIELD OF THE INVENTION

The present invention refers to a wheel reconditioning device used to recuperate the geometry of automotive vehicle wheels when they are damaged due to small accidents such as pot holes, small collisions, rocks, etc.

BACKGROUND OF THE INVENTION

As it is widely known in the art, the occurrence of any type of damage to the wheel of an automotive vehicle that modifies its geometry results in the instability of the wheel, when it is in movement. This is reflected in the vehicle's performance and, more importantly, in the vehicle's reduced level of safety. For this reason, these damages caused to the vehicle wheels must be corrected.

To correct these damages, there are currently in the market some wheel-reconditioning devices. The wheels are fixed on these devices so as to be reconditioned by use of a hydraulic jack that is supported on various places of the equipment. However, these known models encounter the following main technical and functional problems: in order to fasten the wheel, these devices use the wheel hub and therefore require various types of wheel hubs in order to service the many different existing wheel models; the fact that they use the wheel center as one of the support locations to unbend the damaged section compromises the radial axial perpendicularity of the wheel.

Additionally, the damaged wheel positioning and fastening axle on these devices is supported at only one end, with the other end totally free and unsupported; with the applied stress and constant use, this axle is subject to a great amount of bending stress, which eventually results in damage to the equipment.

SUMMARY AND OBJECTS OF THE INVENTION

This new device was developed with the objective of supplying the vehicle maintenance market with an economical, easier and quicker to handle device, that can be universally used since its wheel fastening mechanism allows it to be used on most wheel hub models; additionally, this new device does not use the wheel's nominal axle, fixed by means of bolts, as a support point, but rather adjustable support points so as to limit the work to the damaged section only; and furthermore, the wheel fastening axle is supported at both ends on support columns, forming a rectangular frame that prevents any eventual bending of the wheel supporting axle when the latter is submitted to stress.

BRIEF DESCRIPTION OF THE DRAWINGS

A more complete appreciation of the present invention and many of the attendant advantages thereof will be readily understood by reference to the following description when taken in conjunction with the accompanying drawings, in which.

DETAILED DESCRIPTION OF THE INVENTION

Figure 1:
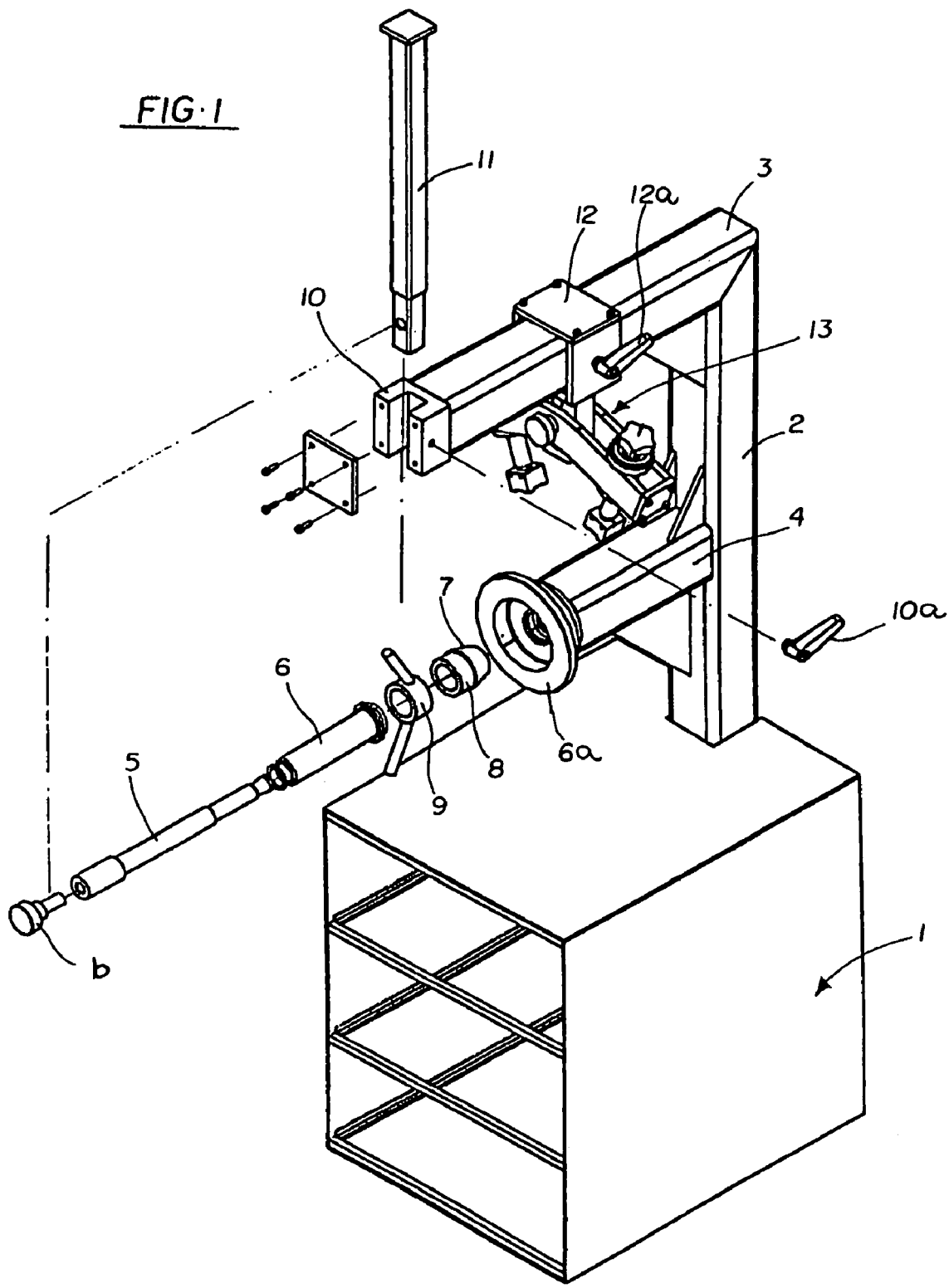
FIG. 1 illustrates the innovative device in a partially exploded perspective.
Figure 2:
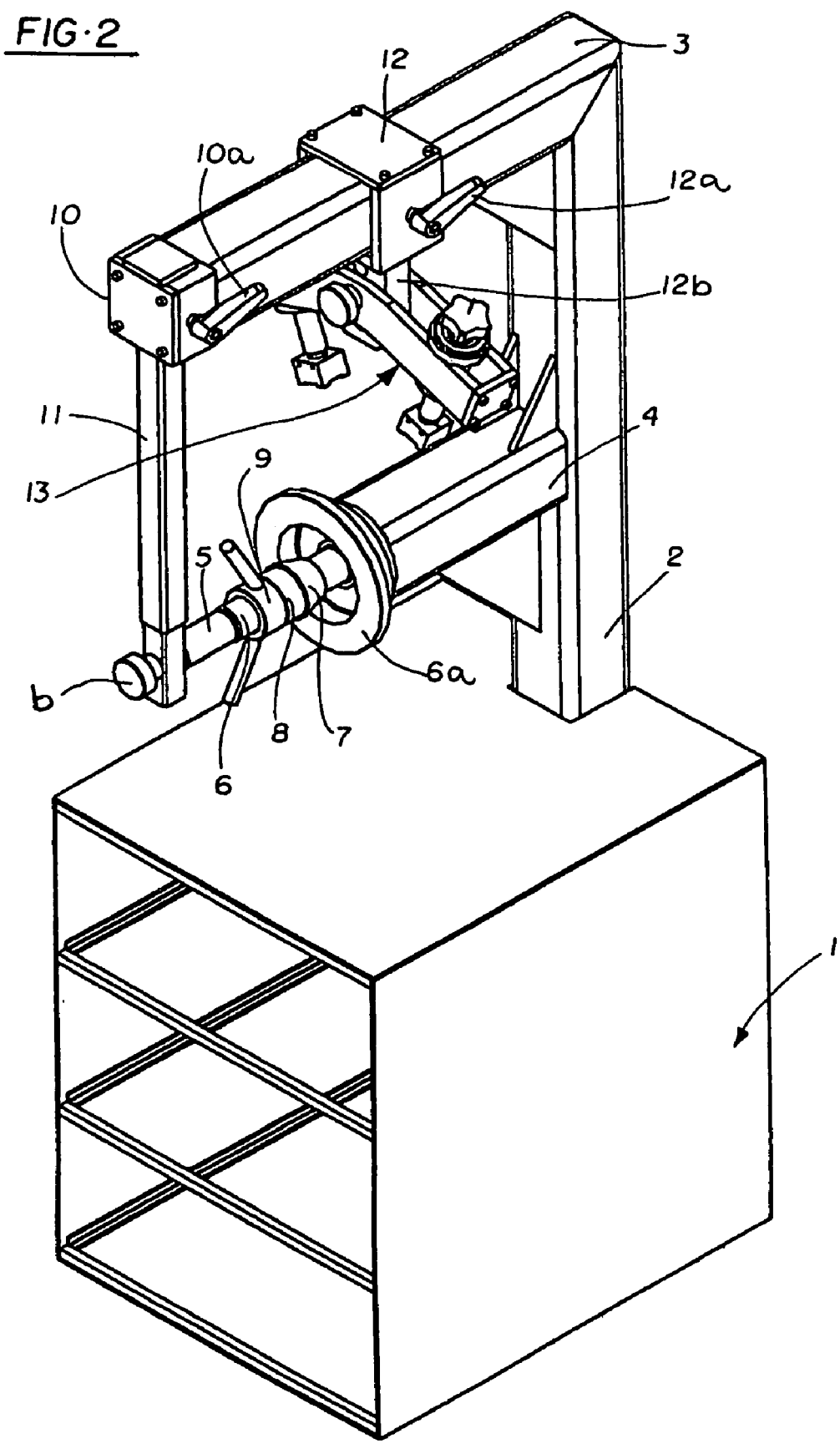
FIG. 2 illustrates the same in an assembled view, but without a mounted wheel.
Figure 3:
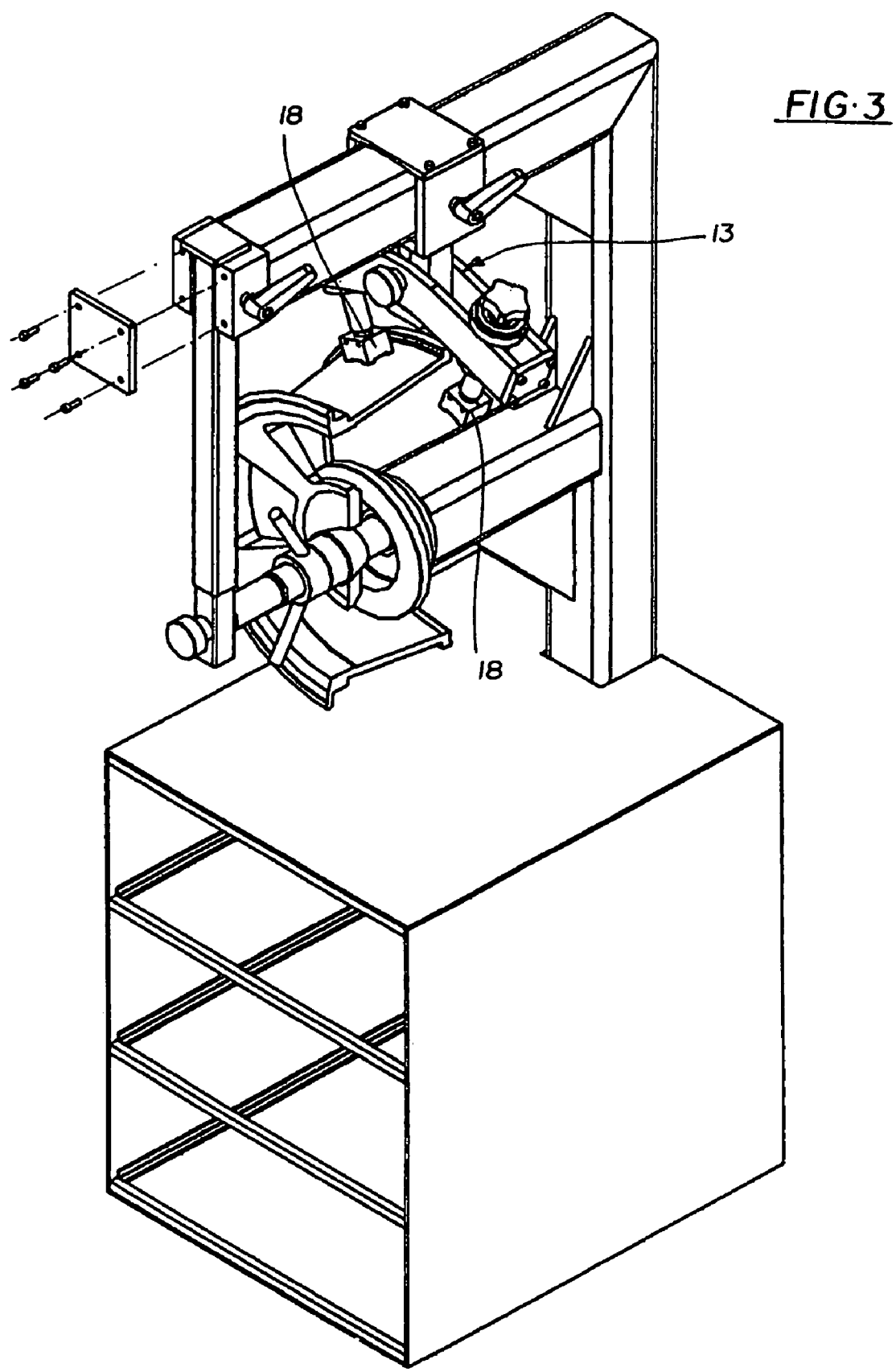
In FIG. 3, the device is presented with the damaged wheel mounted on it.
Figure 4:
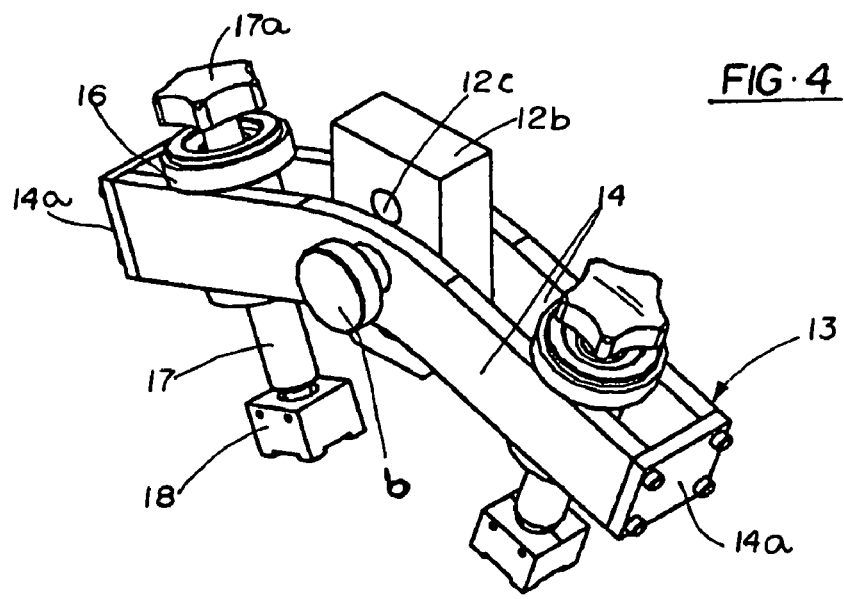
FIGS. 4, 5e 6 illustrate, respectively, in perspective view, frontal view and cross section view, the swinging cross brace that constitutes the wheel unbending counterpoint.
Figure 5:
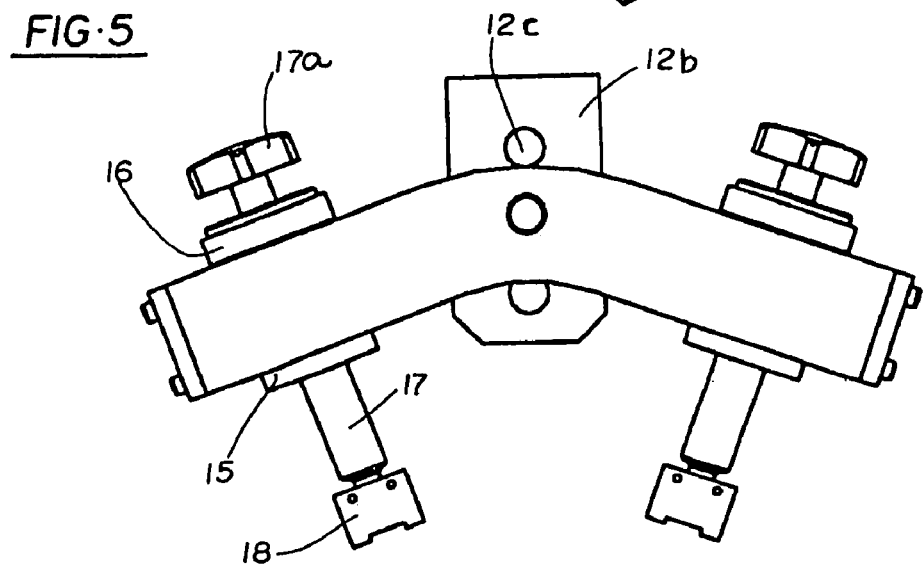
Figure 6:
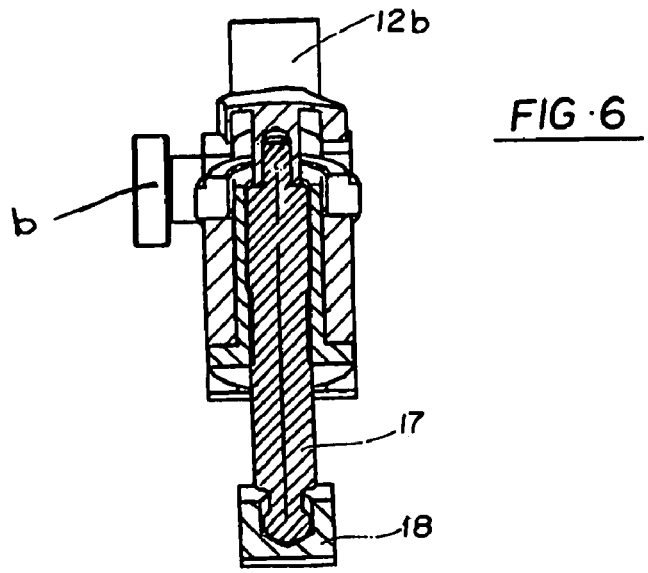

The object of the present invention is a WHEEL RECONDITIONING DEVICE, composed of a base (1), which consists of a work bench with drawers and/or shelves, from whose upper facing extends a vertical and rear column (2) preferably with quadrangular cross section, from which extend forward one upper cross brace (3) and one intermediate cross brace (4), both orthogonal to the vertical column (2), with quadrangular cross section, and adequately fixed to said column (2).

The intermediate cross brace (4), which is shorter than the upper cross brace (3), is equipped with a bolt-fastened axle (5) placed in the brace's mid section; this axle is connected to another axle (6) equipped with a flange (6a) on which the damaged wheel is mounted and fastened by means of the positioning, on said axle (6), of a cone-shaped bushing (7) responsible for centralizing the wheel, of a spacer (8) used when the wheel fastening is inverted, and of a fastening nut (9) equipped with handles (9a), which is used to fix this entire assembly on the axle (6).

A fixed bracket (10) equipped with a mobile vertical column (11) is attached to the front end of the upper cross brace (3); this column can slide up and down inside the bracket (10), and can be fixed in the desired position using the handle (10a), and said mobile column's (11) lower end can be fixed by means of a bolt (b) to the front end of the intermediate cross brace (4) axle (5), thus interconnecting the latter to the upper cross brace (3), and forming a fixed rectangle that prevents any eventual bending between the cross braces when applying force to unbend the wheel installed on the intermediate cross brace (4), or, in other words, when applying force with the hydraulic jack installed on the upper facing of the referred intermediate cross brace (4).

Still on the upper cross brace (3), there is a mobile bracket (12) that can be fixed in the desired position by means of the handle (12a); said bracket (12) is equipped on its lower section with a short vertical rod (12b) provided with trans-fixing holes (12c) located at different heights, on which, by means of a bolt (b), a swinging cross brace (13) is fastened; said cross brace (13) is used to fix the wheel in the desired position and the holes (12c) allow the swinging cross brace (13) to be fastened in accordance with the wheel's diameter.

Said swinging cross brace (13) is composed of two parallel and curved rods (14), with ends interconnected by means of plates (14a), and close to which are positioned the respective special nuts (15) and corresponding upper lock nuts (16), both of which are transfixed by an adjustable bolt (17), equipped, on its upper side, with a tightening handle (17a), and, on its lower side, with swinging prisms (18) that constitute the supports for the wheel's outer surface.

Therefore, the use of this innovative device should proceed as follows: upward displacement of the front column (11); position the wheel on the axle (6) until it contacts the flange (6a); on the axle (6), place the cone-shaped bushing (7), the spacer (8) and screw on the tightening nut (9), thus fastening the wheel in place; displace the front column (11) downwards, until its lower end coincides with the intermediate cross brace's (4) axle (5); tighten the connection bolt (b); rotate the wheel until the damaged section faces upwards, in alignment with the intermediate cross brace (4);

adjust the support prisms (18) on the wheels surface and lock them in place; actuate the hydraulic jack on the damaged section until the desired geometry is obtained; remove the jack, loosen and lift the frontal column; remove the nut (9), the spacer (8), the bushing (7) and, finally, the wheel.

The invention claimed is:

1. WHEEL RECONDITIONING DEVICE, comprising: a base (1), from whose upper facing extends a vertical and rear column (2) preferably with quadrangular cross section, from which extend forward one upper cross brace (3) and one intermediate cross brace (4), both orthogonal to the vertical column (2), preferably with quadrangular cross section too, and adequately fixed to said column (2); said intermediate cross brace (4), which is shorter than the upper cross brace (3), is equipped with a bolt-fastened axle (5) placed in the brace's mid section; this axle is connected to another axle (6) equipped with a flange (6a) on which the damaged wheel is mounted and fastened by means of the positioning, on said axle (6), of a cone-shaped bushing (7), of a spacer (8), and of a fastening nut (9) equipped with handles (9a); a fixed bracket (10) equipped with a mobile vertical column (11) is attached to the front end of the upper cross brace (3); this column can slide up and down inside the bracket (10), and can be fixed in the desired position using the handle (10a), and said mobile column's (11) lower end can be fixed by means of a bolt (b) to the front end of the intermediate cross brace (4) axle (5), thus interconnecting the latter to the upper cross brace (3), and forming a fixed rectangle; said upper cross brace (3), is equipped with a mobile bracket (12) that can be fixed in the desired position by means of the handle (12a); said bracket (12) is equipped on its lower section with a short vertical rod (12b) provided with transfixing holes (12c) located at different heights, on which, by means of a bolt (b), a swinging cross brace (13) is used to fasten the wheel in the desired position, composed of two parallel and curved rods (14) with ends interconnected by means of plates (14a), close to which are positioned the respective special nuts (15) and corresponding upper lock nuts (16), both of which are transfixed by an adjustable bolt (17), equipped, on its upper side, with a tightening handle (17a), and, on its lower side, with a swinging prism (18) that constitutes the support base for the wheel's outer surface.

* * * * *